United States Patent [19]

Rakov

[11] Patent Number: 4,875,062

[45] Date of Patent: Oct. 17, 1989

[54] ION PROJECTION PRINT HEAD

[75] Inventor: David M. Rakov, Irondequoit, N.Y.

[73] Assignee: Eastman Kodak Company, Rochester, N.Y.

[21] Appl. No.: 290,657

[22] Filed: Dec. 27, 1988

[51] Int. Cl.⁴ .............................................. G01D 15/00

[52] U.S. Cl. .................................. 346/159; 346/153.1

[58] Field of Search ...................... 346/150, 153.1, 159; 358/300; 400/119; 355/3 SC

[56] References Cited

U.S. PATENT DOCUMENTS

| | | | |
|---|---|---|---|
| 3,594,162 | 7/1971 | Simm et al. | 96/1 |
| 4,016,813 | 4/1977 | Pressman et al. | 101/426 |
| 4,155,093 | 5/1979 | Fotland et al. | 346/159 |
| 4,338,614 | 7/1982 | Pressman et al. | 346/155 |
| 4,463,363 | 7/1984 | Gundlach et al. | 346/159 |
| 4,491,855 | 1/1985 | Fujii et al. | 346/159 |
| 4,568,955 | 2/1986 | Hosaya et al. | 346/159 |
| 4,593,994 | 6/1986 | Tamura et al. | 355/3 SC |
| 4,675,703 | 6/1987 | Fotland | 346/159 |

*Primary Examiner*—Arthur G. Evans
*Attorney, Agent, or Firm*—Lawrence P. Kessler

[57] ABSTRACT

An ion projection print head for applying ions line-by-line from a substantially uniform linear ion source, in a modulated pattern to a moving ion receptor substrate to form a latent image charge pattern on such substrate corresponding to information to be reproduced. The ion projection print head comprises a substantially planar mask having an elongated slot defined therethrough, the slot being oriented in a longitudinal direction substantially parallel to an element of the ion receptor substrate transverse to the direction of movement of such substrate. A continuous electrode is formed on the side of the mask between the mask and the ion source, and a plurality of electrodes are formed on the side of the mask opposite from the continuous electrode. The plurality of electrodes are spaced apart in insulating relationship from one another and terminate at the slot. An electrical bias is selectively applied to the plurality of electrodes respectively to modulate ion flow through the slot from the ion source to the receptor substrate.

9 Claims, 2 Drawing Sheets

ION PROJECTION PRINT HEAD

BACKGROUND OF THE INVENTION

This invention relates in general to ion projection print heads, and more particularly to an ion projection print head having a plurality of electrodes for modulating and assisting ion flow through a longitudinal slot.

Printing apparatus are generally categorized as impact or non-impact printers. Impact printers typically have an inking device, a paper transport, and a mechanism for mechanically impacting desired characters on transported paper through the inking device. Non-impact printers produce characters on transported paper electrically or optically rather than mechanically. The non-impact electrostatic printing devices are desirable over impact printing devices when noise reduction and increased speed of printing are desired.

One typical process for non-impact printing, referred to as ion projection printing, is shown in U.S. Pat. No. 4,088,891 (issued May 9, 1978, in the name of Smith et al). A mask is interposed between an ion generating corona wire and a receiver having a charge receptor surface. An electrode array, associated with the mask, has a control potential selectively applied thereto to set up an electric control field between the electrode array and an electrode behind the receiver. The mask and the electrode array thus exhibit a blocking or transmitting effect on the flow of ions depending upon their relative potentials. The ions are thus selectively placed on the charge receptor surface of the receiver to form a latent image charge pattern thereon. Such charge pattern is subsequently developed with charged pigmented marking particles to form a developed image, which may then be transferred and fixed to a final receiver sheet or fixed directly to the charge receptor surface.

A common electrode array for the mask includes rows of offset apertures. The projected ions from one row are imaged on the charge receptor surface, and thereafter projected ions from the other row are imaged on the charge receptor surface. It has been found that with such an arrangement charges from the previous row of imaged ions tend to repel like charges of the subsequent row of imaged ions so that adjacent lines of charge do not overlap smoothly. This results in alternating dark and light lines which degrades the resultant image. In order to overcome the problem associated with offset aperture electrode arrays, U.S. Pat. No. 4,338,614 (issued July 6, 1982 in the name of Pressman et al) incorporates a slotted focus plane between the aperture mask and the receiver. The slotted focus plane counteracts the repulsion of the ions deposited by a subsequent row of apertures due to the ions previously deposited by the previous row of apertures. However, since the slotted focus plane must be accurately located relative to the aperture mask, the construction of the overall ion projection printhead arrangement is markedly complicated.

Another process for providing ion projection flow is shown in U.S. Pats. Nos. 4,463,363 (issued July 17, 1984, in the name of Gundlach et al) and 4,524,371 (issued June 18, 1985, in the name of Sheridan et al). In such processes, ions are uniformly generated along the length of a corona wire and carried by a rapidly moving transport fluid (air) through an exit channel within which a modulation electrode array is located. A low voltage bias on the modulation electrode array selectively interrupts the ion travel through the exit channel so that a resultant ion beam, of sufficient current density for marking purposes, is provided. As with the above described process, the ion beam is thus selectively placed on a charge receptor surface of the receiver to form a latent image charge pattern thereon. Such charge pattern is subsequently developed with charged pigmented marking particles to form a developed image, which may then be transferred and fixed to a final receiver sheet or fixed directly to the charge receptor surface. Since the electrodes are on the wall of the slot, the electric field is perpendicular to the path of the ions and only serves to reduce ion flow (i.e., does not enhance ion flow). Additionally, since the slot is relatively deep, the ions spend a long time in the slot and many ions are attracted to the walls of the slot making the system relatively inefficient.

SUMMARY OF THE INVENTION

This invention is directed to an ion projection print head for applying ions line-by-line from a substantially uniform linear ion source, in a modulated pattern to a moving ion receptor substrate to form a latent image charge pattern on such substrate corresponding to information to be reproduced. The ion projection print head comprises a substantially planar mask having an elongated slot defined therethrough, the slot being oriented in a longitudinal direction substantially parallel to an element of the ion receptor substrate transverse to the direction of movement of such substrate. A continuous electrode is formed on the side of the mask between the mask and the ion source, and a plurality of electrodes are formed on the side of the mask opposite from the continuous electrode. The plurality of electrodes are spaced apart in insulating relationship from one another and terminate at the slot. An electrical bias is selectively applied to the plurality of electrodes respectively to modulate ion flow through the slot from the ion source to the receptor substrate.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
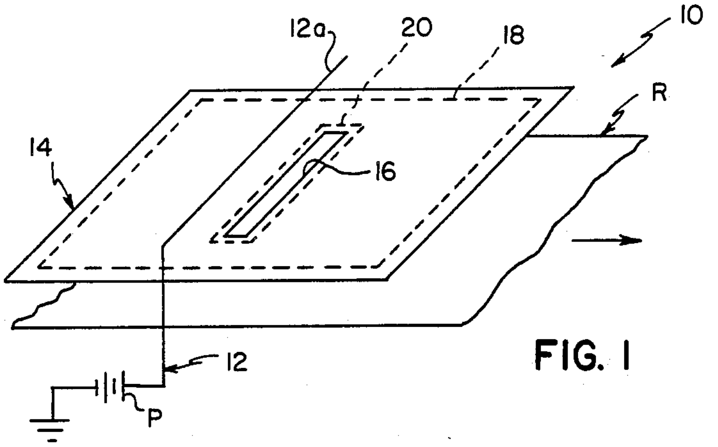
FIG. 1 is a view, in perspective, of the ion projection print head according to this invention, located between a moving ion receptor substrate and a substantially linear uniform ion source.
Figure 2:
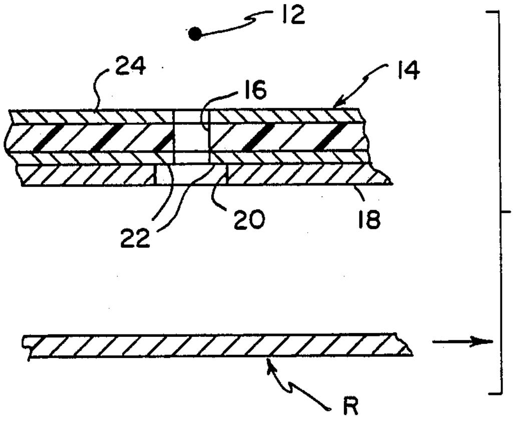
FIG. 2 is a side elevational view, in cross-section of the arrangement of FIG. 1.

Referring now to the accompanying drawings, the ion projection printhead according to this invention is designated generally by the numeral 10. The ion projection print head 10 comprises a corona source 12, a mask 14 defining a slot 16, and a support plate 18 defining a slot 20 (see FIGS. 1 and 2). The support plate 18 is attached to, and serves to support the mask 14. The slot 20 of the support plate 18 is aligned with and slightly wider than the slot 16 in the mask. The corona source 12 is, for example, a wire 12a connected to a potential source P. Excitation of the wire 12a by the potential source P causes the wire to produce a flow of ions, some of which pass through the aligned slots 16 and 20. The mask 14 has a row of control electrodes 22 along each edge of the slot 16 on the side of the mask away from the corona wire 12a. The side of the mask 14 facing the corona wire has a continuous conductor, or backing electrode 24, attached thereto.

The flow of ions through the aligned slots 16 and 20 is modulated by voltages selectively applied to the individual control electrodes 22 by a suitably controllable voltage source V. When voltage opposite in sign to the charge on the ions with respect to the backing electrode is applied to an individual control electrode, the electric field produced between the control electrode and the backing electrode acts to pull ions through the slot, thus improving efficiency of the print head 10. Similarly, when voltage of the same sign as the charge on the ions with respect to the backing electrode is applied to an individual control electrode, the flow of ions through the slot is reduced.

While an ion receptor substrate, such as receiver R, is moved past the slot 16, the line-by-line modulation of the ion flow along the length of the slot by voltage application creates a charge distribution on the substrate. Orientation of the slot 16 so as to lie parallel to an element of the receiver R transverse to the direction of travel of the receiver enables the charge distribution to be made to correspond in imagewise fashion to information desired to be reproduced forming a latent image charge pattern on the receiver. By either continuous modulation or pulse width modulation of the voltage on the individual control electrodes, suitable gray scale in the produced image can be effected. The latent image charge distribution pattern created by the ion projection print head 10 can be subsequently toned and fixed to the receiver in any well known manner to make the latent image visible.

Figure 3:
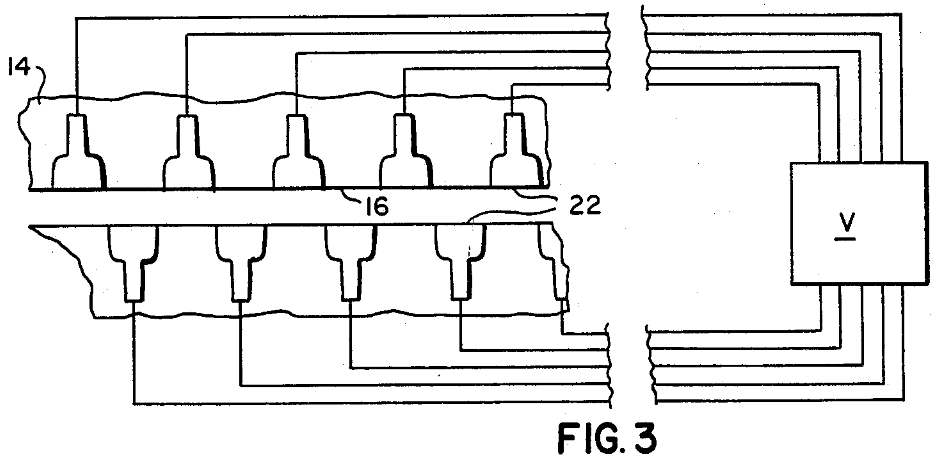
FIG. 3 is a top plan view, on an enlarged scale, of a portion of the ion projection print head of FIG. 1.

The control electrodes 22 are shown in FIG. 3 as being offset on either side of the slot 16 in the mask 14, with their respective terminating ends at the edge of the slot, to work individually from opposite sides of the slot. Of course other variations of the pattern of the control electrodes are suitable for use with this invention. For example, in FIG. 4 the effective areas established by the terminating ends of the electrodes 22′ partially overlap so as to work substantially independently. On the other hand, in FIG. 5 the effective areas established by the terminating ends of the electrodes 22″ are aligned on either side of the slot 16 so that the electrodes work in pairs.

As discussed above, in previously known implementations of ion projection writing using masks with circular apertures rather than a slot, the apertures were arranged in two or more rows in order to provide overlap of the regions addressed by the separate ion beams. This produced a problem that is especially evident when making gray scale images. Because the apertures are staggered, some of the apertures have to deposit charge on the receiver in places that are between places that have already been charged. The electric field due to the charges already on the receiver deflects the ion beams that are written subsequently, so that they do not overlap smoothly, but rather produce an objectionable raster pattern. With the above described ion projection print head 10 according to this invention, this problem is avoided by the use of the slot 16 in the mask 14 rather than the staggered apertures of the prior art. The slot 16 is capable of addressing any point along its length and does not produce raster in solids because adjacent regions in a line are written concurrently.

It has been found that if the spaces between the control electrodes where the insulating substrate is exposed charges up, the flow of ions can be distorted. If this occurs these regions can be coated with a material of the proper low value of conductivity so that the charge drains away without shorting adjacent control electrodes. The material may be, for example, Germanium or tin oxide, applied as a liquid or by evaporation coating. Such material may also be applied to the walls of the slot 16 to prevent charging there. The electrical resistance between adjacent control electrodes must be low enough to drain away the charge that would otherwise accumulate from the ion source, but must be high enough to prevent excessive current draw from the electrode drivers when adjacent control electrode are at different voltages, or between the control electrodes and the backing electrode if the walls of the slot are conductive. It has been found that a suitable surface resistance is on the order of between $1\times10^{7}$ to $1\times10^{12}$ ohms/square, and preferably in the range of between $1\times10^{8}$ and $1\times10^{10}$ ohms/square.

Figure 4:
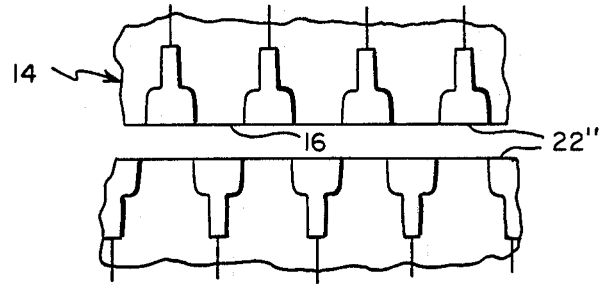
FIG. 4 is a top plan view, on an enlarged scale, of a portion of an alternate embodiment of the ion projection print head of FIG. 1.
Figure 5:
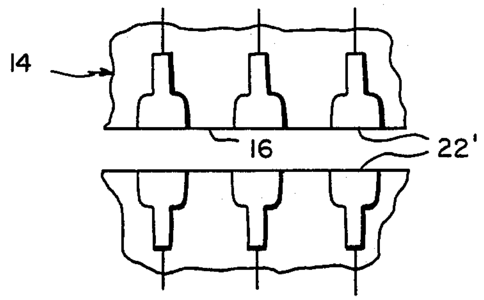
FIG. 5 is a top plan view, on an enlarged scale, of a portion of another alternate embodiment of the ion projection print head of FIG. 1.

According to this invention, an ion projection print head 10 has been made with a mask 14 having a pattern of electrodes similar to that shown in FIG. 4. The slot 16 is approximately 0.02 cms wide and 4.45 cms long. The control electrodes 0.22′ are approximately 0.02 cms wide and on 0.025 cm centers, for an addressability of about 80 lines per cm. The mask 14 consists of 0.01 cm thick Kapton support, ½ ounce copper adhesively attached on both sides, and 0.01 cm thick Kapton overlay on both sides to protect the leads. The control electrodes are formed by etching the copper, leaving the adhesive as a continuous sheet. The copper was plated with gold after etching to protect it from oxidation. The slot 16 was laser drilled from the side of the mask with the continuous electrode 24, using the slot etched in the copper as a mask. The support plate 18 is brass approximately 0.02 cms thick with a slot 0.04 cms wide and about 5.08 cms long. The ion projection print head 10 with such a mask was found to produce suitable images on receivers with reproduced solid areas and gray scale capabilities readily achieved.

The invention has been described in detail with particular reference to a preferred embodiment thereof, but it will be understood that variations and modifications can be effected within the spirit and scope of the invention.

I claim:

1. An ion projection print head for applying ions line-by-line from a substantially uniform linear ion source, in a modulated pattern to a moving ion receptor substrate to form a latent image charge pattern on such substrate corresponding to information to be reproduced, said ion projection print head comprising:

a substantially planar mask having an elongated slot defined therethrough;

a continuous electrode formed on the side of said mask between said mask and said ion source;

a plurality of electrodes formed on the side of said mask opposite from said continuous electrode, said plurality of electrodes being spaced apart from one another and terminating at said slot; and means for selectively applying an electrical bias to said plurality of electrodes respectively to modulate ion flow through said slot from the ion source to said receptor substrate.

2. The invention of claim 1 further including means, located in juxtaposition with said plurality of electrodes, is provided for supporting said mask.

3. The invention of claim 1 wherein the terminating ends of a portion of said plurality of electrodes terminate at one longitudinal edge of said slot, and the terminating ends of another portion of said plurality of electrodes terminate at the opposite longitudinal edge of said slot.

4. The invention of claim 3 wherein the terminating ends of said first portion of said plurality of electrodes are aligned in opposition to the terminating ends of said second portion of said plurality of electrodes.

5. The invention of claim 3 wherein the terminating ends of said first portion of said plurality of electrodes are in located in offset relation to the terminating ends of said second portion of said plurality of electrodes for independent effective ion flow modulation of said offset electrodes.

6. The invention of claim 3 wherein the terminating ends of said first portion of said plurality of electrodes are in located in offset, but overlapping relation to the terminating ends of said second portion of said plurality of electrodes so that the effective ion flow modulation of offset electrodes overlap.

7. The invention of claim 1 wherein said slot is oriented in a longitudinal direction substantially parallel to an element of the ion receptor substrate transverse to the direction of movement of such substrate.

8. The invention of claim 1 wherein said mask has a low conductivity coating between said plurality of electrodes in order to prevent charge build-up.

9. The invention of claim 8 wherein the surface resistance of said low conductivity coating is in the range of between $1\times10^7$ to $1\times10^{12}$ ohms/square.

* * * * *